(12) United States Patent
Shead et al.

(10) Patent No.: US 11,162,402 B2
(45) Date of Patent: Nov. 2, 2021

(54) SELECTIVE CATALYTIC REDUCTION SYSTEM

(71) Applicant: Perkins Engines Company LTD, Peterborough (GB)

(72) Inventors: Leo Shead, Stamford (GB); Alexis Eden, Thrapston (GB); Ronald Silver, Peoria, IL (US); Ben Reid, Shoreham-by-Sea (GB); Graham Hargrave, Loughborough (GB)

(73) Assignee: Perkins Engines Company Limited, Peterborough (GB)

( * ) Notice: Subject to any disclaimer, the term of this patent is extended or adjusted under 35 U.S.C. 154(b) by 318 days.

(21) Appl. No.: 16/463,553

(22) PCT Filed: Dec. 11, 2017

(86) PCT No.: PCT/EP2017/082201
§ 371 (c)(1),
(2) Date: May 23, 2019

(87) PCT Pub. No.: WO2018/114428
PCT Pub. Date: Jun. 28, 2018

(65) Prior Publication Data
US 2021/0285352 A1 Sep. 16, 2021

(30) Foreign Application Priority Data
Dec. 21, 2016 (EP) .................................. 16205949

(51) Int. Cl.
*F01N 3/20* (2006.01)
*B01D 53/94* (2006.01)

(52) U.S. Cl.
CPC ....... *F01N 3/2066* (2013.01); *B01D 53/9431* (2013.01); *B01D 53/9495* (2013.01);
(Continued)

(58) Field of Classification Search
CPC ............ B01D 53/9418; B01D 53/9422; B01D 2251/2067; B01D 2251/2062;
(Continued)

(56) References Cited

U.S. PATENT DOCUMENTS 5,849,593 A * 12/1998 Schmelz ............ B01D 53/9495
436/55
6,361,754 B1 * 3/2002 Peter-Hoblyn ..... B01D 53/9409
423/213.2
(Continued)

FOREIGN PATENT DOCUMENTS

CN 1041288 A 4/1990
CN 101190410 A 6/2008
(Continued)

OTHER PUBLICATIONS

International Search Report for Application No. PCT/EP2017/082201; dated Mar. 6, 2018.

*Primary Examiner* — Timothy C Vanoy

(57) ABSTRACT

A selective catalytic reduction (SCR) system is provided for treating exhaust gas in an exhaust passage. The system comprises a hydrolysis catalyst located in the exhaust passage, and a diesel exhaust fluid (DEF) dosing unit configured to inject DEF onto the hydrolysis catalyst. A SCR catalyst is located in the passage downstream of the hydrolysis catalyst, and a controller controls DEF dosing by the dosing unit. The controller is configured to control the DEF dosing unit such that the DEF is injected at a modulated frequency of less than or equal to 1 Hertz. A method of treating exhaust gas in an exhaust passage using an SCR system is also provided.

12 Claims, 3 Drawing Sheets

(52) U.S. Cl.
CPC ...... *F01N 2240/40* (2013.01); *F01N 2610/02* (2013.01); *F01N 2610/146* (2013.01); *F01N 2610/1453* (2013.01); *F01N 2900/16* (2013.01)

(58) Field of Classification Search
CPC ........ B01D 2257/404; B01D 2258/012; B01D 2258/014; B01D 2258/01; F01N 3/208; F01N 2240/25; F01N 2240/40; F01N 2390/00; F01N 2550/02; F01N 2550/05; F01N 2570/14; F01N 2610/02
See application file for complete search history.

(56) References Cited

U.S. PATENT DOCUMENTS

| | | | |
|---|---|---|---|
| 10,724,413 B2 * | 7/2020 | Han | B01D 53/9431 |
| 2007/0214777 A1 | 9/2007 | Allansson et al. | |
| 2008/0022654 A1 | 1/2008 | Broderick et al. | |
| 2008/0022658 A1 | 1/2008 | Viola et al. | |
| 2009/0272099 A1 | 11/2009 | Garimella et al. | |
| 2010/0150080 A1 | 6/2010 | Ikeda et al. | |
| 2011/0072798 A1 | 3/2011 | Herman | |

FOREIGN PATENT DOCUMENTS

| | | |
|---|---|---|
| CN | 101454543 A | 6/2009 |
| DE | 112010005244 T5 | 11/2012 |
| EP | 2826967 A1 | 9/1988 |
| EP | 2131020 A2 | 12/2009 |
| JP | 2004108185 A | 4/2004 |
| JP | 2009293619 A | 12/2009 |
| JP | 2010504459 A | 2/2010 |
| WO | 2007142899 A2 | 12/2007 |
| WO | WO 2008/139146 A2 | 11/2008 |
| WO | 2011099051 A1 | 8/2011 |

* cited by examiner

SELECTIVE CATALYTIC REDUCTION SYSTEM

CROSS-REFERENCE TO RELATED APPLICATION

This Application is a 35 USC § 371 U.S. National Stage filing of International Application No. PCT/EP2017/082201 filed on Dec. 11, 2017 which claims priority under the Paris Convention to European Patent Application No. 16205949.7 filed Dec. 21, 2016.

FIELD OF INVENTION

This invention relates to selective catalytic reduction systems for treating diesel engine exhaust gases.

BACKGROUND OF INVENTION

Selective catalytic reduction (SCR) systems are known and are generally included in the exhaust systems of diesel engines in order to treat the exhaust gases of such engines. Such systems involve the introduction of a diesel exhaust fluid (DEF) into exhaust gas flowing in an exhaust passage of an engine. The DEF contains urea which undergoes a hydrolysis and/or thermolysis within the exhaust passage whereby ammonia is produced. The ammonia passes into a SCR catalyst where it converts any nitrogen oxides (NCO) present in the exhaust gas into nitrogen and water before passing out of the exhaust into the atmosphere.

A number of SCR systems which dose DEF into the exhaust passage have been proposed, Such systems are sometimes referred to as "wet spray" systems and inject a spray of aqueous urea into the exhaust gas where it decomposes to form ammonia. An example of such a system is shown in US2008/022654, U.S. '654 discloses a SCR system which includes a SCR catalyst and a reagent injector that injects DEF onto the SCR catalyst downstream of the SCR catalyst. The reagent injector injects DEF at a frequency of between 1 Hz and 10 Hz.

When dosing DEF onto a hydrolysis catalyst in a SCR system under certain conditions the DEF cools the catalyst sufficiently to either slow down or effectively prevent thermolysis of urea and subsequent hydrolysis of isocyanic acid, and desorption of ammonia and the isocyanic acid. This suppression of ammonia release creates a lag or delay in the function of the hydrolysis catalyst. This limits the amount of control which can be exerted over ammonia storage in the SCR catalyst, and NOx conversion. Furthermore, the slowed or prevented thermolysis of urea can also lead to urea deposits forming in the exhaust passage, and unreacted urea or ammonia passing untreated out of the exhaust passage in an ammonia slip event if, for example, an exhaust inlet temperature rise occurs, Prior SCR systems inject a volume of DEF using a DEF injector at a flow rate governed by a supply pressure of the DEF with only short periods of time of typically less than one second between injection events. This does not allow the temperature of the hydrolysis catalyst to recover at low and medium temperature conditions and/or flow rate conditions, which ultimately suppresses ammonia production, Known SCR systems tend to use injection pulse width modulation frequencies which are as high as possible.

It is an object of the present invention to obviate or mitigate at least one of the aforementioned disadvantages with known SCR exhaust systems.

SUMMARY OF INVENTION

According to a first aspect of the invention there is provided a selective catalytic reduction (SCR) system for treating exhaust gas in an exhaust passage, the system comprising:
 a hydrolysis catalyst located in the exhaust passage;
 a diesel exhaust fluid (DEF) dosing unit configured to inject DEF onto the hydrolysis catalyst;
 a SCR catalyst located in the passage downstream of the hydrolysis catalyst; and
 a controller adapted to control DEF dosing by the dosing unit, wherein the controller is configured to control the DEF dosing unit such that the DEF is injected at a modulated frequency of less than or equal to 1 Hertz.

According to a second aspect of the invention there is provided an exhaust apparatus for a vehicle, the apparatus including a SCR system in accordance with the first aspect of the invention.

According to a third aspect of the invention there is provided a vehicle including a SCR system in accordance with the first aspect of the invention.

According to a fourth aspect of the invention there is provided a method of treating exhaust gas in an exhaust passage using an SCR system, the method comprising the steps of:
 providing a hydrolysis catalyst located in the exhaust passage, a diesel exhaust fluid (DEF) dosing unit for injecting DEF into the passage at a variable DEF dosing rate and a controller;
 injecting DEF onto the hydrolysis catalyst; and
 controlling DEF dosing such that the DEF is injected at a modulated frequency of less than or equal to 1 Hertz.

BRIEF DESCRIPTION OF THE DRAWINGS

Preferred embodiments of the present invention will now be described, by way of example only, with reference to the accompanying drawings, in which.

DETAILED DESCRIPTION OF THE DRAWINGS

Figure 1:
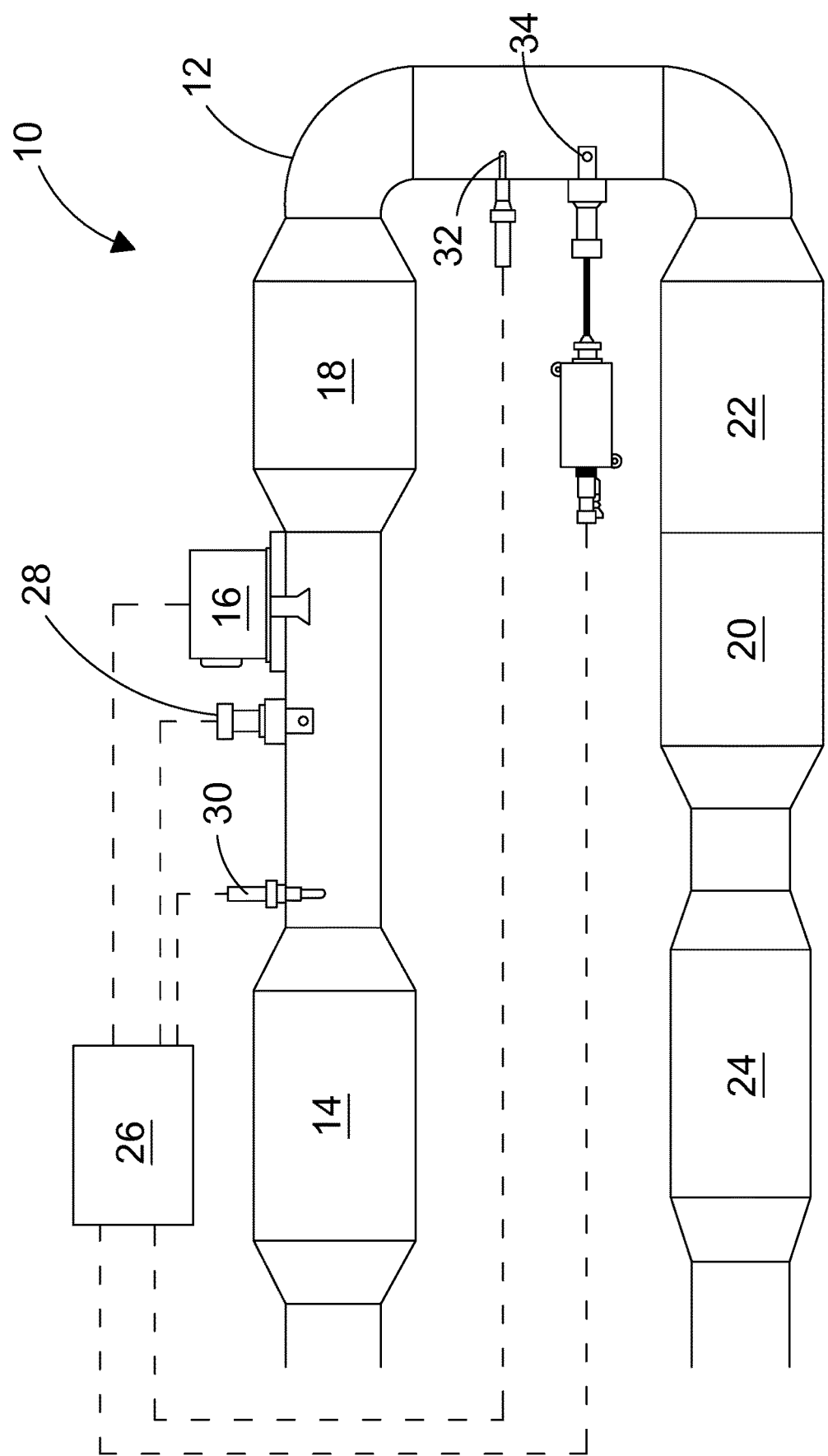
FIG. 1 is a schematic diagram of a selective catalytic reduction (SCR) system.

With reference to FIG. 1 there is shown a selective catalytic reduction (SCR) system 10. The system 10 is located in an exhaust passage 12 which conveys exhaust gas away from an engine (not shown) of a vehicle (not shown). The exhaust gas first passes through a diesel oxidation catalyst (DOC) 14 of a known type, which may optionally form part of the system 10. The DOC 14 catalyses an oxidation reaction of hydrocarbons and carbon monoxide in the exhaust gas to produce carbon dioxide and water.

Located downstream of the DOC 14 is a diesel exhaust fluid (DEF) dosing unit 16 which is configured to inject DEF onto a hydrolysis catalyst 18 located downstream of the DOC 14 in the exhaust passage 12. The DEF dosing unit 16 is of a known type, and injects DEF in the form of an aqueous urea solution. The hydrolysis catalyst 18 is of a known type and catalyses a hydrolysis reaction of the DEF in which ammonia and carbon dioxide are produced.

Located downstream of the hydrolysis catalyst 18 in the exhaust passage 12 is a SCR catalyst 20, which is also of a known type. The SCR catalyst 20 catalyses a reduction reaction between nitrogen oxide (NOx) in the exhaust gas and the ammonia downstream of the hydrolysis catalyst 18 in which the NOx is reduced into nitrogen and water. The system 10 may optionally include a SCR catalyst filter 22 which is located immediately upstream of the SCR catalyst 20. The SCR catalyst filter 22 is configured to prevent larger particles in the exhaust passage entering the SCR catalyst 20.

Located downstream of the SCR catalyst 20 in the exhaust passage 12 is an optional ammonia slip (AS) catalyst 24 of a known type which is configured to oxidise any unreacted ammonia which has passed through the SCR catalyst 20 before it can pass out of the exhaust into the atmosphere.

The system 10 also includes a controller 26 which is in communication with the DEF dosing unit 16 and is configured to control a rate at which the DEF dosing unit 16 injects DEF onto the hydrolysis catalyst 18. The controller 26 is also configured to control the DEF dosing unit 16 between an on state and an off state. In the on state the DEF dosing unit 16 injects DEF onto the hydrolysis catalyst 18 at a non-zero rate set by the controller 26 and in the off state DEF dosing unit does not inject DEF onto the hydrolysis catalyst 18. The controller 26 is configured to employ pulse frequency modulation to control a modulated frequency of the DEF dosing unit 16 between the on and off states, and to also employ pulse width modulation to control a modulated time period in which the DEF dosing unit injects DEF fluid onto the hydrolysis catalyst 18.

The system 10 also includes a plurality of sensors which are in communication with the controller 26.

A nitrogen oxide (NOx) sensor 28 is located upstream of the hydrolysis catalyst 18 and is configured to measure NOx levels in the exhaust passage 12. The NOx sensor 28 is in communication with the controller 26.

Also located upstream of the hydrolysis catalyst 18, is a first, or an inlet, temperature sensor 30 that is in communication with the controller 26. The inlet temperature sensor 30 is configured to measure an exhaust gas temperature upstream of the hydrolysis catalyst 18.

Located between the hydrolysis catalyst 18 and the SCR catalyst 20 is a second temperature sensor 32 that is in communication with the controller 26 and configured to measure a temperature value of the exhaust gas by sending a signal to the controller 26. The second temperature sensor 32 may be located between the hydrolysis catalyst 18 and the SCR catalyst 20, Alternatively, the second temperature sensor 32 may be located inside the hydrolysis catalyst 18.

Also located between the hydrolysis catalyst 18 and the SCR catalyst 20 is an ammonia sensor 34 that is in communication with the controller 26.

INDUSTRIAL APPLICABILITY

Figure 2:
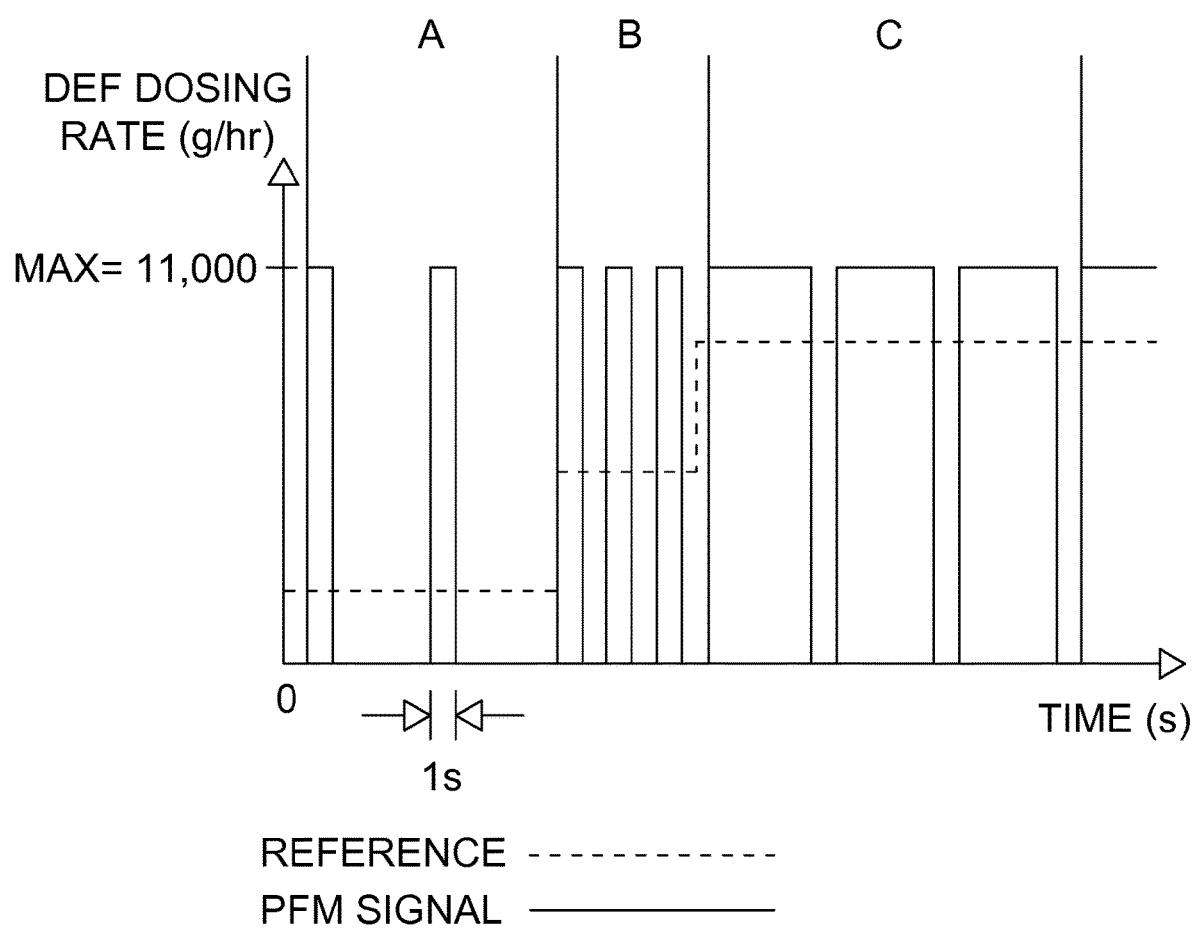
FIG. 2 shows an example dosing pattern of the SCR system of FIG. 1.

With reference to FIGS. 1 and 2, an example of how the system 10 of the present invention would work in practice will now be described.

When exhaust, gas from an engine flows through the passage 12, the controller 26 controls the DEF dosing unit 16 such that the modulated frequency at which it injects DEF onto the hydrolysis catalyst 18 is less or equal to 1 Hz. Preferably, when the controller 26 controls the DEF dosing unit 16 such that it is in the on state the DEF dosing unit 16 injects DEF onto the hydrolysis catalyst 18 at a rate of 11,000 grams per hour.

The controller 26 also adjusts the modulated frequency at which the DEF dosing unit 16 injects DEF onto the hydrolysis catalyst 18 in response to signals received from one of the first or second temperature sensors 30, 32, and/or the mass flow rate of the exhaust gas in the exhaust passage, which is calculated in a known manner. For example, the controller 26 may control the DEF dosing unit 16 such that it increases the modulated frequency at which it injects DEF onto the hydrolysis catalyst 18, if the temperature of the exhaust gas at the hydrolysis catalyst 18 is above a predetermined level.

An example dosing pattern which may be used in the system 10 is depicted as a graph in FIG. 2. In the example pattern, the minimum time for which the DEF dosing unit 16 is in the off state is 1s, and the minimum time for which the dosing unit 16 is in the on state is 1s. Throughout the example dosing pattern the DEF dosing unit 16 injects DEF fluid onto the hydrolysis catalyst 18 at a rate of 11,000 grams per hour when it is in the on state.

Initially in phase A of the example dosing pattern, the DEF dosing unit 16 is in the on state for periods of 1s and is in the off state for periods of 4s. In phase B the frequency has increased, where the DEF dosing unit 16 is in the on state for periods of 1s and is in the off state for periods of 1s. In phase C, the DEF dosing unit 16 is in the on state for periods of 3s and is in the off state for periods of 1 s.

Rather than increasing the modulated frequency of DEF injection events as has been proposed in prior SCR systems to produce more ammonia to reduce NOx into less harmful gases, the system according to the present invention decreases the modulated frequency of the injection events to produce more ammonia to reduce NOx. In the system described above, the temperature of the hydrolysis catalyst is allowed to recover between injection events thanks to the dosing frequency of 1 Hz or less which allows for more effective conversion of DEF into ammonia. This means that more ammonia is available for the selective catalytic reduction reaction at the SCR catalyst. Therefore, the system described above has increased NOx reduction capabilities and ammonia slip events do not occur.

Figure 3:
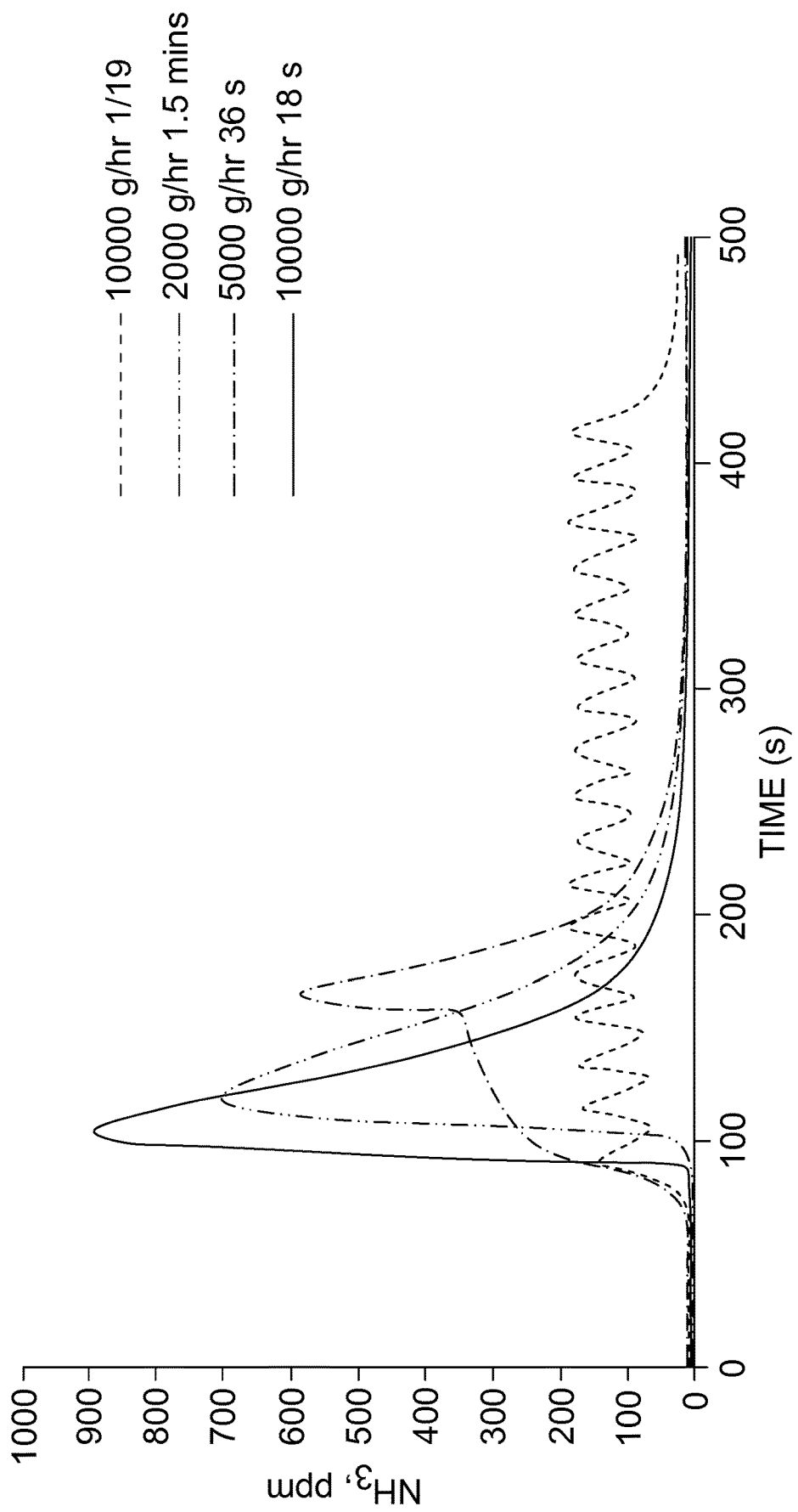
FIG. 3 shows a graph of ammonia production for various example dosing rates.

Proof of the effective conversion of DEF into ammonia using the SCR system according to the invention is shown in FIG. 3. FIG. 3 shows the ammonia production for tests using various DEF dosing rates over various time periods. Ammonia production is greatest for a dosing rate of 10000 g/hr over a period of 18 seconds, wherein maximum ammonia production is approximately 900 parts per million. Ammonia production is significantly less for the lower 2000 g/hr and 5000 g/hr dosing rates which are over longer time periods of 90 and 36 seconds, respectively, wherein maximum ammonia production is approximately 700 and 590 parts per million, respectively. This shows that ammonia production is much greater for high dosing rates over short periods of time than for lower dosing rates over long periods of time.

Modifications and improvements may be incorporated without departing from the scope of the invention, which is defined by the appended claims.

For example, modulation of the DEF injection frequency may be based upon particular trigger conditions relating to the internal conditions of the hydrolysis catalyst. An embedded model of the hydrolysis catalyst and an estimator may use ammonia and temperature sensor readings from the hydrolysis catalyst outlet, as well as NOx sensor readings from the hydrolysis catalyst inlet in order to establish the trigger conditions.

The invention claimed is:

1. A selective catalytic reduction (SCR) system for treating exhaust gas in an exhaust passage, the system comprising:
   a hydrolysis catalyst located in the exhaust passage;
   a diesel exhaust fluid (DEF) dosing unit configured to inject DEF onto the hydrolysis catalyst;
   a SCR catalyst located in the passage downstream of the hydrolysis catalyst; and
   a controller adapted to control DEF dosing by the dosing unit,
   wherein the controller is configured to control the DEF dosing unit such that the DEF is injected at a modulated frequency of less than or equal to 1 Hertz.

2. The system of claim 1, wherein the controller is configured to control the DEF dosing unit such that the DEF dosing unit injects DEF over a modulated time period of at least 1s.

3. The system of claim 1, wherein the system further comprises at least one temperature sensor in communication with the controller, wherein the controller is configured to selectively adjust the modulated frequency of the DEF dosing unit in response to signals received from the at least one temperature sensor.

4. The system of claim 3, wherein the at least one temperature sensor is located inside the hydrolysis catalyst.

5. The system of claim 1, wherein the controller is configured to selectively adjust the modulated frequency in response to variations in a mass flow rate of exhaust gas in the exhaust passage.

6. An exhaust apparatus for a vehicle, the apparatus including the SCR system of any of claim 1.

7. A vehicle including the SCR system of any of claim 1.

8. A method of treating exhaust gas in an exhaust passage using an SCR system, the method comprising the steps of:
   providing a hydrolysis catalyst located in the exhaust passage, a diesel, exhaust fluid (DEF) dosing unit for injecting DEF into the passage at a variable DEF dosing rate and a controller;
   injecting DEF onto the hydrolysis catalyst; and
   controlling DEF dosing such that the DEF is injected at a modulated frequency of less than or equal to 1 Hertz.

9. The method of claim 8, wherein the method further comprises the step of:
   injecting DEF fluid over a modulated time period of at least 1s.

10. The method of claim 8, wherein the method further comprises the steps of providing at least one temperature sensor; and adjusting the modulated frequency of the DEF dosing unit in response to signals received from the at least one temperature sensor.

11. The method of claim 10, wherein the step of providing at least one temperature sensor comprises locating the at least one temperature sensor inside the hydrolysis catalyst.

12. The method of any of claim 8, further comprising the step of adjusting the modulated frequency of the DEF dosing unit in response to changes in a mass flow rate of exhaust gas in the exhaust passage.

* * * * *